US012452857B2

(12) United States Patent
Hsieh et al.

(10) Patent No.: US 12,452,857 B2
(45) Date of Patent: Oct. 21, 2025

(54) METHOD AND USER EQUIPMENT FOR CROSS-CARRIER SCHEDULING FROM SECONDARY CELL TO PRIMARY CELL

(71) Applicant: MEDIATEK INC., Hsin-Chu (TW)

(72) Inventors: Chi-Hsuan Hsieh, Hsin-Chu (TW); Yi-Ju Liao, Hsin-Chu (TW); Wei-De Wu, Hsin-Chu (TW); Pei-Kai Liao, Hsin-Chu (TW); Chia-Hao Yu, Hsin-Chu (TW)

(73) Assignee: MediaTek Inc., Hsinchu (TW)

(*) Notice: Subject to any disclaimer, the term of this patent is extended or adjusted under 35 U.S.C. 154(b) by 237 days.

(21) Appl. No.: 17/689,982

(22) Filed: Mar. 8, 2022

(65) Prior Publication Data

US 2022/0322384 A1    Oct. 6, 2022

Related U.S. Application Data

(60) Provisional application No. 63/248,592, filed on Sep. 27, 2021, provisional application No. 63/230,130, (Continued)

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0038* (2013.01); *H04L 27/26025* (2021.01);
(Continued)

(58) Field of Classification Search
CPC ..... H04W 72/20; H04W 72/23; H04W 24/08; H04W 72/0446; H04W 72/1263;
(Continued)

(56) References Cited

U.S. PATENT DOCUMENTS

| | | | | |
|---|---|---|---|---|
| 2020/0059894 | A1* | 2/2020 | Siomina | H04W 72/30 |
| 2022/0053522 | A1* | 2/2022 | MolavianJazi | H04L 27/26025 |
| 2023/0025742 | A1* | 1/2023 | Agiwal | H04W 72/23 |
| 2023/0284205 | A1* | 9/2023 | Nory | H04W 72/232 |
| | | | | 370/329 |

FOREIGN PATENT DOCUMENTS

| | | | | |
|---|---|---|---|---|
| CN | 104937865 A | | 9/2015 | |
| WO | 2020001225 A1 | | 1/2020 | |
| WO | WO-2021154054 A1 * | | 8/2021 | H04L 5/001 |

OTHER PUBLICATIONS

R1-2008830, ZTE, "Discussion on Cross-Carrier Scheduling from SCell to PCell", 3GPP TSG RAN WG1 Meeting #103-e e-Meeting, sections 1, 2.1, 2.2.2, dated Oct. 26-Nov. 13, 2020 (6 pages).
3GPP, "Physical layer procedures for control (Release 16)", 3GPP TS 38.213 V16.5.0, sections 10, 10.1, dated Mar. 2021 (184 pages).
(Continued)

*Primary Examiner* — Mahran Y Abu Roumi
(74) *Attorney, Agent, or Firm* — Helen Mao; Zheng Jin; Imperium Patent Works

(57) ABSTRACT

Method and UE are provided for scheduling for CCS from SCell to PCell. In particular, a UE can connect to a PCell and a SCell. A CCS is configured between the PCell and the SCell. According to a UE type, the UE can monitor PDCCHs from both the PCell and the SCell in a same slot when the UE is a first type UE, or ignore the PDCCHs from the SCell in the same slot when the UE is a second type UE.

18 Claims, 4 Drawing Sheets

Related U.S. Application Data filed on Aug. 6, 2021, provisional application No. 63/171,129, filed on Apr. 6, 2021.

(51) Int. Cl.
  *H04L 27/26* (2006.01)
  *H04W 24/08* (2009.01)
  *H04W 72/0446* (2023.01)
  *H04W 72/20* (2023.01)

(52) U.S. Cl.
  CPC ....... *H04W 24/08* (2013.01); *H04W 72/0446* (2013.01); *H04W 72/20* (2023.01)

(58) Field of Classification Search
  CPC ............. H04L 1/0038; H04L 27/26025; H04L 5/001; H04L 5/0053
  See application file for complete search history.

(56) References Cited

OTHER PUBLICATIONS

R1-2007870, CATT, "PDCCH monitoring adaptation", 3GPP TSG RAN WG1 #103-e e-Meeting, sections 2, 4.2, dated Oct. 26-Nov. 13, 2020 (8 pages).
R1-2100110, ZTE, "Discussion on Cross-Carrier Scheduling from SCell to PCell", 3GPP TSG RAN WG1 Meeting #104-e e-Meeting, sections 2.3, 2.3.1, 2.3.2, dated Jan. 25-Feb. 5, 2021 (9 pages).
China Intellectual Property Office Action 202210311864.X Dated Mar. 28, 2025.
3GPP TSG RAN WG1 #104_e, R1-2101088_ ETRI,"Cross-carrier scheduling from SCell to PCell" Jan. 18, 2021.
3GPP TSG RAN WG1 Meeting #103_e R1-2008830, ZTE, "Discussion on Cross-Carrier Scheduling from SCell to PCell" Nov. 1, 2020.
3GPP TSG RAN WG1#103_e, R1-2007870, CATT,"PDCCH monitoring adaptation", Nov. 1, 2020.

* cited by examiner

METHOD AND USER EQUIPMENT FOR CROSS-CARRIER SCHEDULING FROM SECONDARY CELL TO PRIMARY CELL

CROSS REFERENCE TO RELATED APPLICATIONS

This application claims priority under 35 U.S.C. § 119 from U.S. Provisional Application No. 63/171,129, entitled "Scheduling behaviors and BD/CCE limit determination for Cross-Carrier Scheduling from SCell to PCell/PSCell," filed on Apr. 6, 2021; U.S. Provisional Application No. 63/230,130, entitled "BD/CCE limit determination and PDCCH overbooking/dropping behaviors of USS sets for Cross-Carrier Scheduling from sSCell to P(S)Cell," filed on Aug. 6, 2021; and U.S. Provisional Application No. 63/248,592, entitled "BD/CCE limit formula determination and PDCCH overbooking/dropping behaviors of USS/CSS sets for Cross-Carrier Scheduling from sSCell to P(S)Cell," filed on Sep. 27, 2021, the subject matter of which is incorporated herein by reference.

TECHNICAL FIELD

The disclosed embodiments relate generally to wireless communication, and, more particularly, to method and apparatus for cross-carrier scheduling from secondary cell to primary cell.

BACKGROUND

In conventional network of 3rd generation partnership project (3GPP) 5G new radio (NR), as the number of NR devices in a network increases, there may not be enough NR physical downlink control channel (PDCCH) scheduling resources on NR primary cell (PCell) in the shared carriers. Therefore, cross-carrier scheduling (CCS) of scheduling PCell by a corresponding secondary cell (SCell) is developed. However, detail of the procedure of scheduling PCell by the corresponding SCell has not been discussed yet.

SUMMARY

Method and user equipment (UE) are provided for scheduling for cross-carrier scheduling (CCS) from secondary cell (SCell) to primary cell (PCell). In particular, a UE can connect to a PCell and a SCell. A CCS is configured between the PCell and the SCell. According to a UE type, the UE can monitor physical downlink control channels (PDCCHs) from both the PCell and the SCell in a same slot when the UE is a first type UE, or ignore the PDCCHs from the SCell in the same slot when the UE is a second type UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
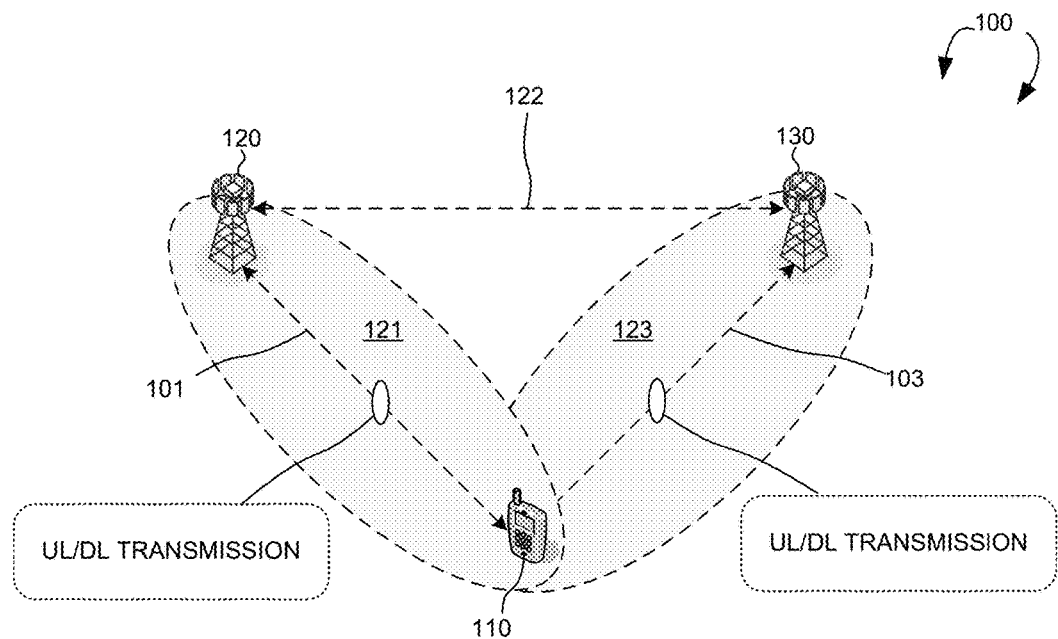
FIG. 1 illustrates an exemplary 5G new radio network supporting scheduling for cross-carrier scheduling (CCS) from secondary cell (SCell) to primary cell (PCell) in accordance with embodiments of the current invention. The base stations of the two cells can be either co-located or non-co-located.

FIG. 1 illustrates an exemplary 5G new radio (NR) network 100 supporting cross-carrier scheduling (CCS) from secondary cell (SCell) to primary cell (PCell) in accordance with aspects of the current invention. The 5G NR network 100 includes a user equipment (UE) 110 communicatively connected to a PCell 121 served by base station 120 and a SCell 123 served by base station 130. It should be noted that the PCell 121 may include general primary cell or primary cell of a secondary cell group (i.e., PSCell). In some embodiments, base station 120 of the PCell 121 and base station 130 of the SCell 123 may be either co-located or non-co-located.

The PCell 121 and the SCell 123 may provide radio access using a Radio Access Technology (RAT) (e.g., the 5G NR technology). The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The PCell 121 may provide communication coverage for a geographic coverage area in which communications with the UE 110 is supported via a communication link 101. The SCell 123 may provide communication coverage for a geographic coverage area in which communications with the UE 110 is supported via a communication link 103. The communication links 101 and 103 shown in the 5G NR network 100 may respectively include uplink (UL) transmissions from the UE 110 to the cells 121/123 (e.g., on the Physical Uplink Control Channel (PUCCH) or Physical Uplink Shared Channel (PUSCH)) or downlink (DL) transmissions from the cells 121/123 to the UE 110 (e.g., on the Physical Downlink Control Channel (PDCCH) or Physical Downlink Shared Channel (PDSCH)). The PCell 121 and the SCell 123 may communicate with each other via a communication link 122.

In the network 100, CCS from the SCell 123 to the PCell is configured. In particular, when CCS from the SCell 123 to the PCell 121 is configured, some PDCCHs of the PCell 121 may be re-allocated to the SCell 123. In other words, these allocated PDCCHs on the SCell 123 may impose control to the PCell 121.

Figure 2:
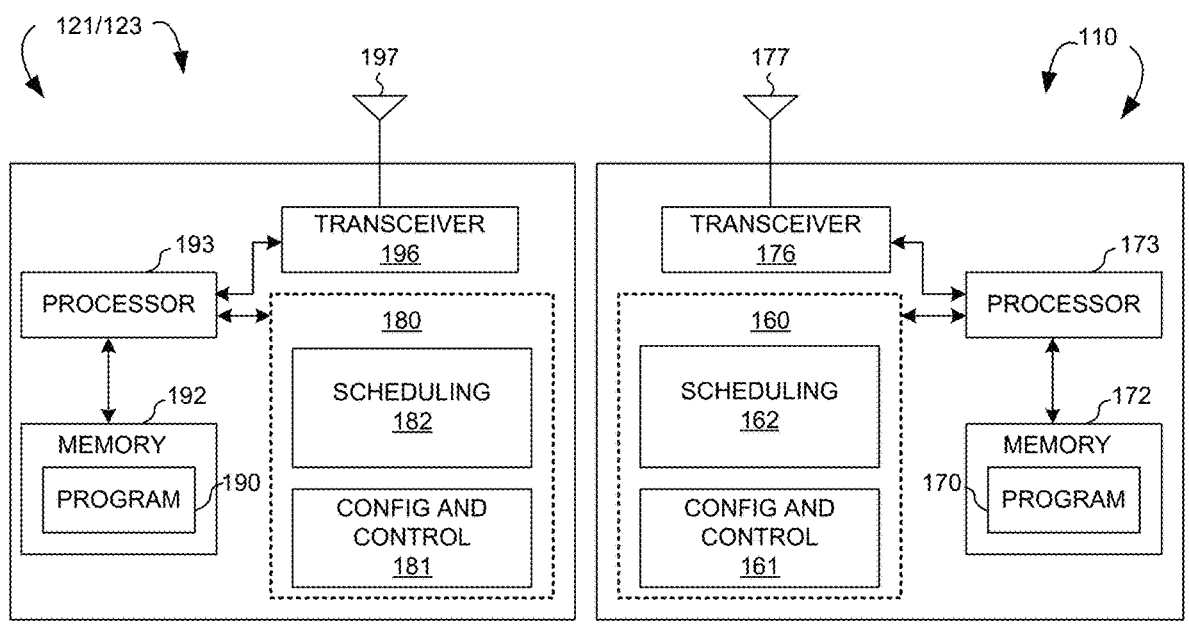
FIG. 2 is a simplified block diagram of the cell and the UE in accordance with embodiments of the current invention.

FIG. 2 is a simplified block diagram of the PCell 121/SCell 123 (the PCell 121 or the SCell 123) and the UE 110 in accordance with embodiments of the present invention. For the PCell 121/SCell 123, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the PCell 121/SCell 123. Memory 192 stores program instructions and data 190 to control the operations of the PCell 121/SCell 123.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The PCell 121/SCell 123 and the UE 110 also include several functional modules and circuits that can be implemented and configured to perform embodiments of the present invention. In the example of FIG. 2, the PCell 121/SCell 123 includes a set of control functional modules and circuit 180. Scheduling circuit 182 handles CCS from the SCell 123 to the PCell 121 and associated network parameters for the UE 110. Configuration and control circuit 181 provides different parameters to configure and control the UE 110. The UE 110 includes a set of control functional modules and circuit 160. Scheduling circuit 162 handles CCS from the SCell 123 to the PCell 121 and associated network parameters. Configuration and control circuit 161 handles configuration and control parameters from the PCell 121/SCell 123.

Note that the different functional modules and circuits can be implemented and configured by software, firmware, hardware, and any combination thereof. The function modules and circuits, when executed by the processors 193 and 173 (e.g., via executing program codes 190 and 170), allow the PCell 121/SCell 123 and the UE 110 to perform embodiments of the present invention.

In some embodiments, the UE 110 may: (1) monitor PDCCHs from both the PCell 121 and the SCell 123 in a same slot when the UE 110 is a first type UE (e.g., an advanced UE supporting CCS from SCell to PCell); or (2) ignore the PDCCHs from the SCell 123 in the same slot when the UE 110 is a second type UE (e.g., a legacy UE that does not support CCS from SCell to PCell).

Figure 3:
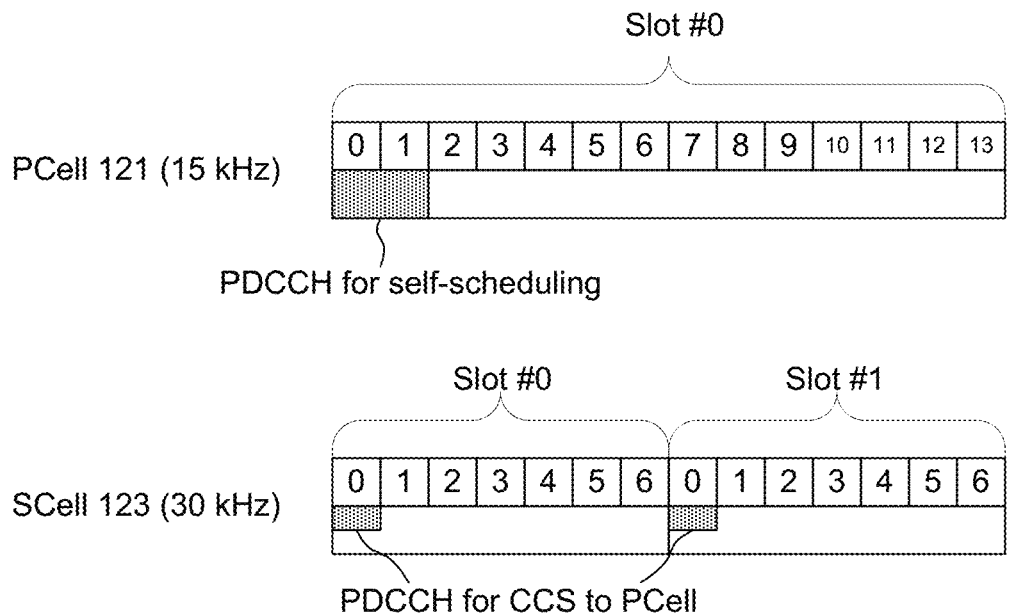
FIG. 3 illustrates one example of cell slot(s) in accordance with embodiments of the current invention.

FIG. 3 illustrates one example of cell slot(s) in accordance with one novel aspect. In this example, sub-carrier spacing (SCS) of the PCell 121 is 15 kHz, SCS of the SCell 123 is 30 kHz and the UE 110 is the second type UE. Because the UE 110 is the second type UE (e.g., a legacy UE), the UE 110 may not expect to monitor PDCCHs from both the PCell 121 and the SCell 123 in the same slot for scheduling PDSCHs of the PCell 121. Therefore, the UE 110 only monitors the PDCCHs for self-scheduling from the PCell 121 and ignores the PDCCH for CCS from the SCell 123 in the same slot (i.e., the slot #0).

In some embodiments, at least one common search space (CSS) set (e.g., Type 0/0A/1/2 CSS set) on the PCell 121 may be configured to overlap with at least one UE specific search space (USS) set, which is for scheduling the PCell 121, on the SCell 123. The UE 110 may drop the at least on USS set, which is for scheduling the PCell 121, on the SCell 123.

Figure 4:
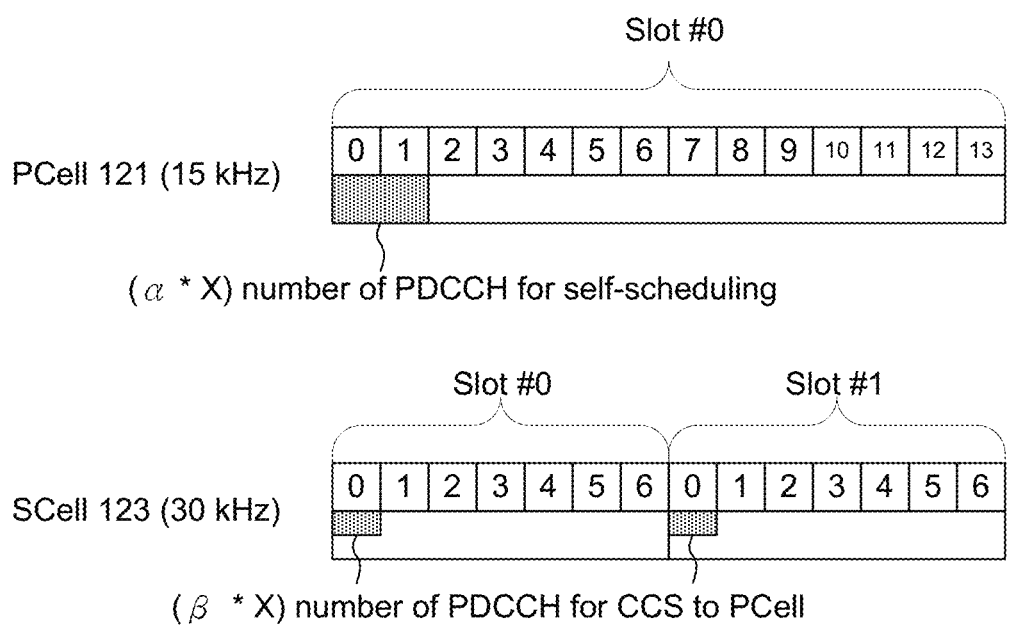
FIG. 4 illustrates one example of cell slot(s) in accordance with embodiments of the current invention.

FIG. 4 illustrates one example of cell slot(s) in accordance with one novel aspect. In this example, SCS of the PCell 121 is 15 kHz, SCS of the SCell 123 is 30 kHz and the UE 110 is the first type UE. Because the UE 110 is the first type UE (e.g., an advanced UE supporting CCS from SCell to PCell), the UE 110 may monitor PDCCHs from both the PCell 121 and the SCell 123 in the same slot for scheduling PDSCHs of the PCell 121. Therefore, the UE 110 monitors the PDCCHs for self-scheduling from the PCell 121 and monitors the PDCCH for CCS from the SCell 123 in the same slot (i.e., the slot #0).

More specifically, on the PCell 121, the UE 110 monitors at most $\alpha \times X$ number of PDCCH blind detection candidates per PCell slot. On the SCell 123, the UE 110 monitors at most $\beta \times X$ number of PDCCH blind detection candidates per PCell slot.

In some embodiments, $\alpha + \beta = 1$. In some embodiments, $\alpha$, $\beta$ or both may be configured in a radio resource control (RRC) configuration transmitted from the PCell 121 to the UE 110. For example, $\alpha$ can be configured between 0 and 1.

In some embodiments, X may be $\min(M_{PDCCH}^{max,slot,\mu}, M_{PDCCH}^{total,slot,\mu})$ while $\mu$ is the SCS (e.g., 15 kHz) of the PCell 121. $M_{PDCCH}^{max,slot,\mu}$ is the maximum number of monitored PDCCH candidates per slot on the PCell 121. $M_{PDCCH}^{total,slot,\mu}$ may be $\lfloor N_{cells}^{cap} \times M_{PDCCH}^{max,slot,\mu} \times N_{cells}^{DL,\mu} / \sum_{j=0}^{3} N_{cells}^{DL,j} \rfloor$ while $N_{cells}^{cap}$ is a number of cell that the UE 110 is capable of connecting to, and $N_{cells}^{DL,j}$ is a number of DL cell with an SCS j that the UE 110 is configured.

In some embodiments, the $\alpha \times X$ number of PDCCH blind detection candidates on the PCell 121 may be configured for an overbooking procedure of PDCCH. In particular, the maximum number of PDCCH blind detection candidates used for overbooking procedure may not exceed $\alpha \times X$.

In some embodiments, at most $\alpha \times X$ number of PDCCH blind detection candidates may be monitored. For example, for CCS from the SCell 123 to PCell 121, a number $M_{S_{uss}}$ of counted PDCCH candidates for monitoring for USS set $S_{uss}$ may be at most $\alpha \times X$.

Figure 5:
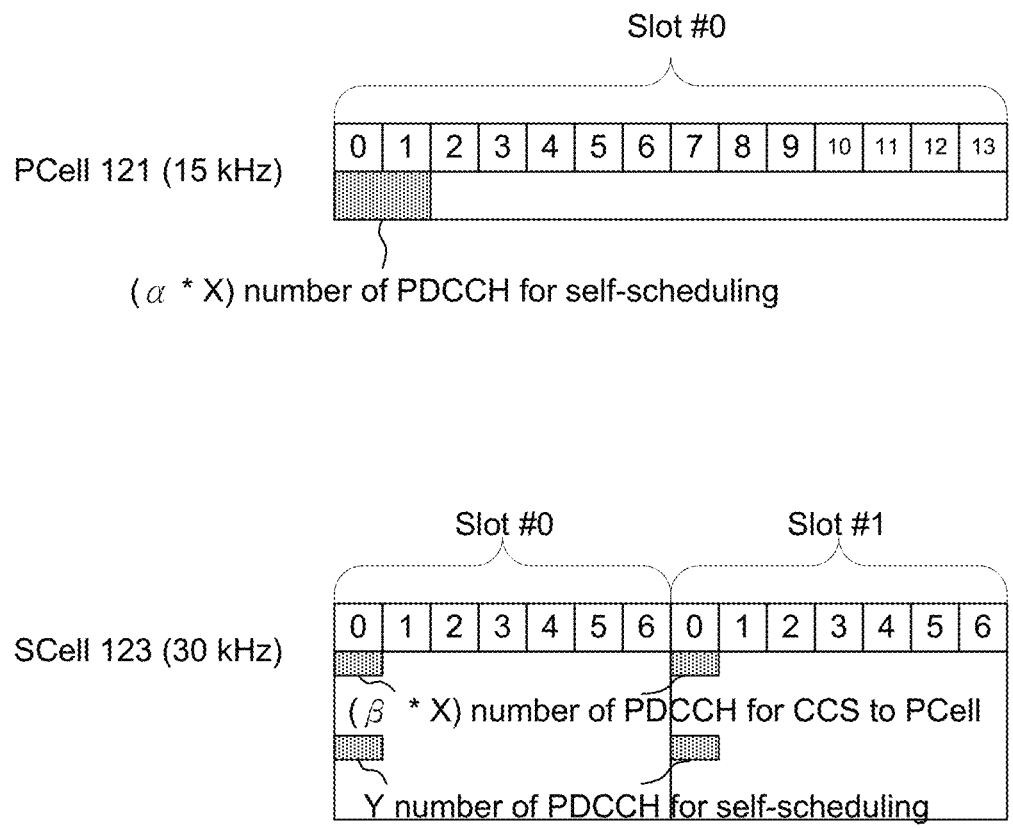
FIG. 5 illustrates one example of cell slot(s) in accordance with embodiments of the current invention.

FIG. 5 illustrates one example of cell slot(s) in accordance with one novel aspect. In this example, SCS of the PCell 121 is 15 kHz, SCS of the SCell 123 is 30 kHz and the UE 110 is the first type UE. Because the UE 110 is the first type UE (e.g., an advanced UE supporting CCS from SCell to PCell), the UE 110 may monitor PDCCHs from both the PCell 121 and the SCell 123 in the same slot for the PCell 121. Therefore, the UE 110 monitors the PDCCHs for self-scheduling from the PCell 121 and monitors the PDCCH for CCS from the SCell 123 in the same slot (i.e., the slot #0). In these embodiments, the UE 110 monitors the PDCCHs for self-scheduling from the SCell 123.

More specifically, on the PCell 121, the UE 110 monitors at most $\alpha \times X$ number of PDCCH blind detection candidates per PCell slot. On the SCell 123, the UE 110 monitors: (1) at most Y number of PDCCH blind detection candidates per SCell slot; and (2) at most $\beta \times X$ number of PDCCH blind detection candidates per PCell slot. In some embodiments, $\alpha + \beta = 1$.

In some embodiments, X may be $\min(M_{PDCCH}^{max,slot,\mu}, M_{PDCCH}^{total,slot,\mu})$ while $\mu$ is the SCS (e.g., 15 kHz) of the PCell 121. $M_{PDCCH}^{max,slot,\mu}$ is the maximum number of monitored PDCCH candidates per slot on the PCell 121. $M_{PDCCH}^{total,slot,\mu}$ may be $\lfloor N_{cells}^{cap} \times M_{PDCCH}^{max,slot,\mu} \times N_{cells}^{DL,\mu} / \sum_{j=0}^{3} N_{cells}^{DL,j} \rfloor$ while $N_{cells}^{cap}$ is a number of cell that the UE 110 is capable of connecting to, and $N_{cells}^{DL,j}$ is a number of DL cell with an SCS j that the UE 110 is configured.

In some embodiments, Y is $\min(M_{PDCCH}^{max,slot,\mu 1}, M_{PDCCH}^{total,slot,\mu 1})$ or $M_{PDCCH}^{max,slot,\mu 1}$ while $\mu 1$ is the SCS (e.g., 30 kHz) of the SCell 123. $M_{PDCCH}^{max,slot,\mu 1}$ is maximum number of monitored PDCCH candidates per slot on the SCell 123. $M_{PDCCH}^{total,slot,\mu 1}$ may be $\lfloor N_{cells}^{cap} \times M_{PDCCH}^{max,slot,\mu 1} \times N_{cells}^{DL,\mu 1} / \Sigma_{j=0}^{3} N_{cells}^{DL,j} \rfloor$ while $N_{cells}^{cap}$ is a number of cell that the UE 110 is capable of connecting to, and $N_{cells}^{DL,j}$ is a number of DL cell with an SCS j that the UE 110 is configured.

In these embodiments, $M_{PDCCH}^{total,slot,\mu}$ may be scaled by applying a first weight and $M_{PDCCH}^{total,slot,\mu 1}$ may be scaled by applying a second weight. The sum of the first weight and the second weight may be 1. For example, the first weight is 1 and the second weight is 0.

It should be noted that $M_{PDCCH}^{max,slot,\mu}$ or $M_{PDCCH}^{max,slot,\mu 1}$ mentioned above may be defined as the below table of the 3GPP specification:

| $\mu$ | $M_{PDCCH}^{max, slot, \mu}$ maximum number of monitored PDCCH candidates per slot |
|---|---|
| 0 | 44 |
| 1 | 36 |
| 2 | 22 |
| 3 | 20 |

In some embodiments, some downlink control information (DCI) of PDCCH should be transmitted between the UE 110 and the PCell 121. Specifically, DCI format 2_5 (used for integrated access and backhaul control) or DCI format 2_6 (wake-up signal which is used outside active time) needs to be transmitted from the PCell 121 to the UE 110. The UE may receive/monitor DCI format 2_5 or DCI format 2_6 from the PCell 121 only.

Figure 6:
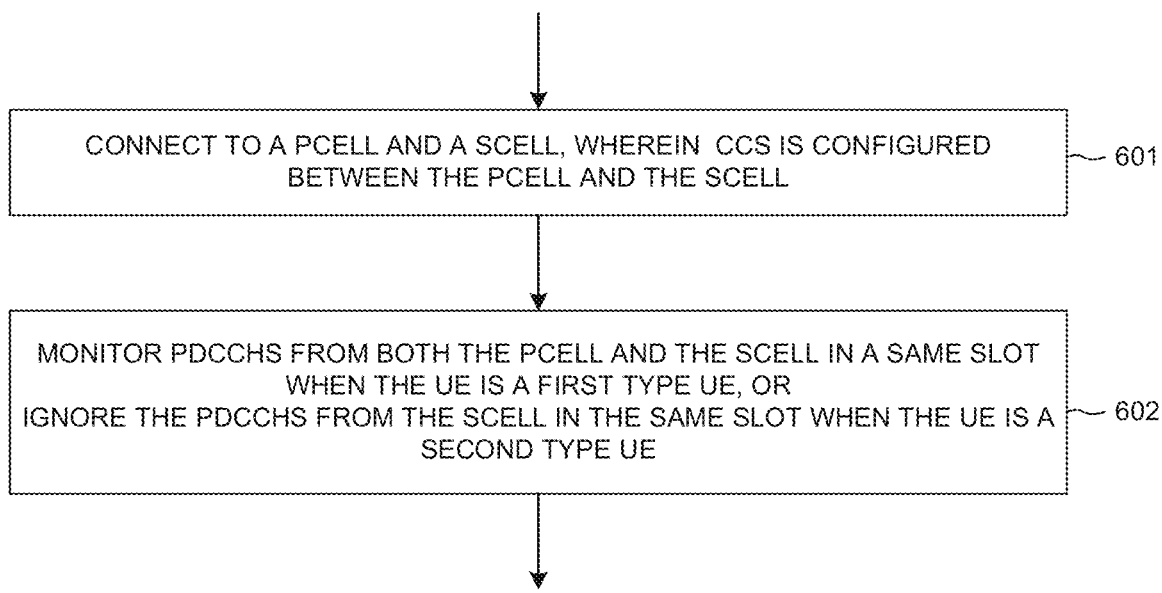
FIG. 6 is a flow chart of a method of scheduling for CCS from SCell to PCell in accordance with embodiments of the current invention.

FIG. 6 is a flow chart of a method of scheduling for CCS from SCell to PCell from UE perspective in a 5G/NR network in accordance with one novel aspect. In step 601, a UE connects to a PCell and a SCell. CCS is configured between the PCell and the SCell. In step 602, the UE monitors PDCCHs from both the PCell and the SCell in a same slot when the UE is a first type UE, or ignores the PDCCHs from the SCell in the same slot when the UE is a second type UE. In some embodiments, the first type UE may be an advanced UE supporting CCS from SCell to PCell, and the second type UE may be a legacy UE.

In some embodiments, when the UE is the second type UE and at least one CSS set on the PCell is configured to overlap with at least one USS set, which is for scheduling the PCell, on the SCell, the step 602 may further include dropping the at least on USS set, which is for scheduling the PCell, on the SCell.

In some embodiments, when the UE is the first type UE, the step 602 may further include: (1) monitoring at most $\alpha \times X$ number of PDCCH blind detection candidates per PCell slot on the PCell; and (2) monitoring at most $\beta \times X$ number of PDCCH blind detection candidates per PCell slot on the SCell.

In some embodiments, $\alpha + \beta = 1$. In some embodiments, $\alpha$, $\beta$ or both may be configured in an RRC configuration transmitted from the PCell 121 to the UE 110. For example, $\alpha$ can be configured between 0 and 1.

In some embodiments, X may be min $(M_{PDCCH}^{max,slot,\mu}, M_{PDCCH}^{total,slot,\mu})$ while $\mu$ is the SCS (e.g., 15 kHz) of the PCell. $M_{PDCCH}^{max,slot,\mu}$ is the maximum number of monitored PDCCH candidates per slot on the PCell. $M_{PDCCH}^{total,slot,\mu}$ may be $\lfloor N_{cells}^{cap} \times M_{PDCCH}^{max,slot,\mu} \times N_{cells}^{DL,\mu} / \Sigma_{j=0}^{3} N_{cells}^{DL,j} \rfloor$ while $N_{cells}^{cap}$ is a number of cell that the UE is capable of connecting to, and $N_{cells}^{DL,j}$ is a number of DL cell with an SCS j that the UE is configured.

In some embodiments, the $\alpha \times X$ number of PDCCH blind detection candidates on the PCell may be configured for an overbooking procedure of PDCCH. In particular, the maximum number of PDCCH blind detection candidates used for overbooking procedure may not exceed $\alpha \times X$.

In some embodiments, at most $\alpha \times X$ number of PDCCH blind detection candidates may be monitored. For example, for CCS from the SCell to PCell, a number $M_{S_{uss}}$ of counted PDCCH candidates for monitoring for USS set $S_{uss}$ may be at most $\alpha \times X$.

In some embodiments, when the UE is the first type UE, the step 602 may further include: monitor at most Y number of PDCCH blind detection candidates per SCell slot on the SCell.

In some embodiments, Y is $\min(M_{PDCCH}^{max,slot,\mu 1}, N_{PDCCH}^{total,slot,\mu 1})$ or $M_{PDCCH}^{max,slot,\mu 1}$ while $\mu 1$ is the SCS (e.g., 30 kHz) of the SCell. $M_{PDCCH}^{max,slot,\mu 1}$ is maximum number of monitored PDCCH candidates per slot on the SCell. $M_{PDCCH}^{total,slot,\mu 1}$ may be $\lfloor N_{cells}^{cap} \times M_{PDCCH}^{max,slot,\mu 1} \times N_{cells}^{DL,\mu 1} / \Sigma_{j=0}^{3} N_{cells}^{DL,j} \rfloor$ while $N_{cells}^{cap}$ is a number of cell that the UE is capable of connecting to, and $N_{cells}^{DL,j}$ is a number of DL cell with an SCS j that the UE is configured.

In these embodiments, $M_{PDCCH}^{total,slot,\mu}$ may be scaled by applying a first weight and $M_{PDCCH}^{total,slot,\mu 1}$ may be scaled by applying a second weight. The sum of the first weight and the second weight may be 1. For example, the first weight is 1 and the second weight is 0.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   connecting, by a user equipment (UE), to a primary cell and a secondary cell, wherein a cross-carrier scheduling (CCS) is configured between the primary cell and the secondary cell; and
   monitoring, by the UE, physical downlink control channels (PDCCHs) from both the primary cell and the secondary cell in a same slot when the UE is a first type UE, and ignoring, by the UE, the PDCCHs from the secondary cell in the same slot when the UE is a second type UE, wherein when the UE is the second type UE, and when at least one common search space (CSS) set on the primary cell is configured to overlap with at least one UE specific search space (USS) set on the secondary cell, which is for scheduling the primary cell, dropping, by the second type UE, the at least one USS set on the secondary cell, and wherein the first type UE is configured not to support CCS and the second type UE is configured to support CCS.

2. The method of claim 1, wherein when the UE is the first type UE, and the step of monitoring the PDCCHs from both the primary cell and the secondary cell in the same slot further comprises:
   monitoring, by the UE, at most $\alpha \times X$ number of PDCCH blind detection candidates per primary cell slot on the primary cell; and monitoring, by the UE, at most β×X number of PDCCH blind detection candidates per primary cell slot on the secondary cell, wherein α+β=1.

3. The method of claim 2, wherein α is between 0 and 1, and is configured in a radio resource control (RRC) configuration.

4. The method of claim 2, wherein X is min $(M_{PDCCH}^{max,slot,\mu}, M_{PDCCH}^{total,slot,\mu})$, while μ is a first subcarrier spacing (SCS) of the primary cell, $M_{PDCCH}^{max,slot,\mu}$ is maximum number of monitored PDCCH candidates per slot on the primary cell, and $M_{PDCCH}^{total,\ slot,\mu}$ is $\lfloor N_{cells}^{cap} \times M_{PDCCH}^{max,slot,\mu} \times N_{cells}^{DL,\mu}/\Sigma_{j=0}^{3} N_{cells}^{DL,j} \rfloor$ while $N_{cells}^{cap}$ is a number of cell that the UE is capable of connecting to, and $N_{cells}^{DL,j}$ is a number of downlink cell with an SCS j that the UE is configured.

5. The method of claim 4, wherein the α×X number of PDCCH blind detection candidates on the primary cell is configured for an overbooking procedure.

6. The method of claim 4, wherein the first SCS u of the primary cell is less than or equal to a second SCS μ1 of the secondary cell, and the method further comprises:

monitoring, by the UE, at most Y number of PDCCH blind detection candidates per secondary cell slot on the secondary cell, wherein Y is min $(M_{PDCCH}^{max,slot,\mu 1}, M_{PDCCH}^{total,slot,\mu 1})$ or $M_{PDCCH}^{max,slot,\mu 1}$, $M_{PDCCH}^{max,slot,\mu 1}$ is maximum number of monitored PDCCH candidates per slot on the secondary cell, and $M_{PDCCH}^{total,slot,\mu 1}$ is $\lfloor N_{cells}^{cap} \times M_{PDCCH}^{max,slot,\mu 1} \times N_{cells}^{DL,\mu 1}/\Sigma_{j=0}^{3} N_{cells}^{DL,j} \rfloor$;

wherein $M_{PDCCH}^{total,slot,\mu}$ is scaled by applying a first weight, $M_{PDCCH}^{total,slot,\mu 1}$ is scaled by applying a second weight and a sum of the first weight and the second weight is 1.

7. The method of claim 6, wherein the first weight is 1 and the second weight is 0.

8. The method of claim 2, wherein at most α×X number of PDCCH blind detection candidates are monitored.

9. The method of claim 1, wherein a downlink control information (DCI) having DCI format 2_5 or DCI format 2_6 is received from the primary cell.

10. A user equipment (UE) comprising:
a transceiver that:
connects to a primary cell and s secondary cell, wherein a cross-carrier scheduling (CCS) is configured between the primary cell and the secondary cell;
a scheduling circuit that:
monitors physical downlink control channels (PDCCHs) from both the primary cell and the secondary cell in a same slot when the UE is a first type UE; and
ignores the PDCCHs from the secondary cell in the same slot when the UE is a second type UE, wherein when the UE is the second type UE, and when at least one common search space (CSS) set on the primary cell is configured to overlap with at least one UE specific search space (USS) set on the secondary cell, which is for scheduling the primary cell, dropping, by the second type UE, the at least one USS set on the secondary cell, and
wherein the first type UE is configured not to support CCS and the second type UE is configured to support CCS.

11. The UE of claim 10, wherein when the UE is the first type UE, and the scheduling circuit further:
monitors at most α×X number of PDCCH blind detection candidates per primary cell slot on the primary cell; and
monitors at most β×X number of PDCCH blind detection candidates per primary cell slot on the secondary cell, wherein α+β=1.

12. The UE of claim 11, wherein α is between 0 and 1, and is configured in a radio resource control (RRC) configuration.

13. The UE of claim 11, wherein X is min $(M_{PDCCH}^{max,slot,\mu}, M_{PDCCH}^{total,slot,\mu})$ while μ is a first subcarrier spacing (SCS) of the primary cell, $M_{PDCCH}^{max,slot,\mu}$ is maximum number of monitored PDCCH candidates per slot on the primary cell, and $M_{PDCCH}^{total,slot,\mu}$ is $\lfloor N_{cells}^{cap} \times M_{PDCCH}^{max,slot,\mu} \times N_{cells}^{DL,\mu}/\Sigma_{j=0}^{3} N_{cells}^{DL,j} \rfloor$ while $N_{cells}^{cap}$ is a number of cell that the UE is capable of connecting to, and $N_{cells}^{DL,j}$ is a number of downlink cell with an SCS j that the UE is configured.

14. The UE of claim 13, wherein the α×X number of PDCCH blind detection candidates on the primary cell is configured for an overbooking procedure.

15. The UE of claim 13, wherein the first SCS u of the primary cell is less than or equal to a second SCS μ1 of the secondary cell, and the scheduling circuit further:
monitors at most Y number of PDCCH blind detection candidates per secondary cell slot on the secondary cell, wherein Y is min $(M_{PDCCH}^{max,slot,\mu 1}, M_{PDCCH}^{total,slot,\mu 1})$ or $M_{PDCCH}^{max,slot,\mu 1}$, $M_{PDCCH}^{max,slot,\mu 1}$ is maximum number of monitored PDCCH candidates per slot on the secondary cell, and $M_{PDCCH}^{total,slot,\mu 1}$ is $\lfloor N_{cells}^{cap} \times M_{PDCCH}^{max,slot,\mu 1} \times N_{cells}^{DL,\mu 1}/\Sigma_{j=0}^{3} N_{cells}^{DL,j} \rfloor$;
wherein $M_{PDCCH}^{total,slot,\mu}$ is scaled by applying a first weight, $M_{PDCCH}^{total,slot,\mu 1}$ is wherein M scaled by applying a second weight and a sum of the first weight and the second weight is 1.

16. The UE of claim 15, wherein the first weight is 1 and the second weight is 0.

17. The UE of claim 11, wherein at most α×X number of PDCCH blind detection candidates are monitored.

18. The UE of claim 10, wherein a downlink control information (DCI) having DCI format 2_5 or DCI format 2_6 is received from the primary cell.

* * * * *